May 10, 1938.  H. R. TROTTER  2,116,855
AUTOMOTIVE BRAKE SYSTEM
Filed March 23, 1936
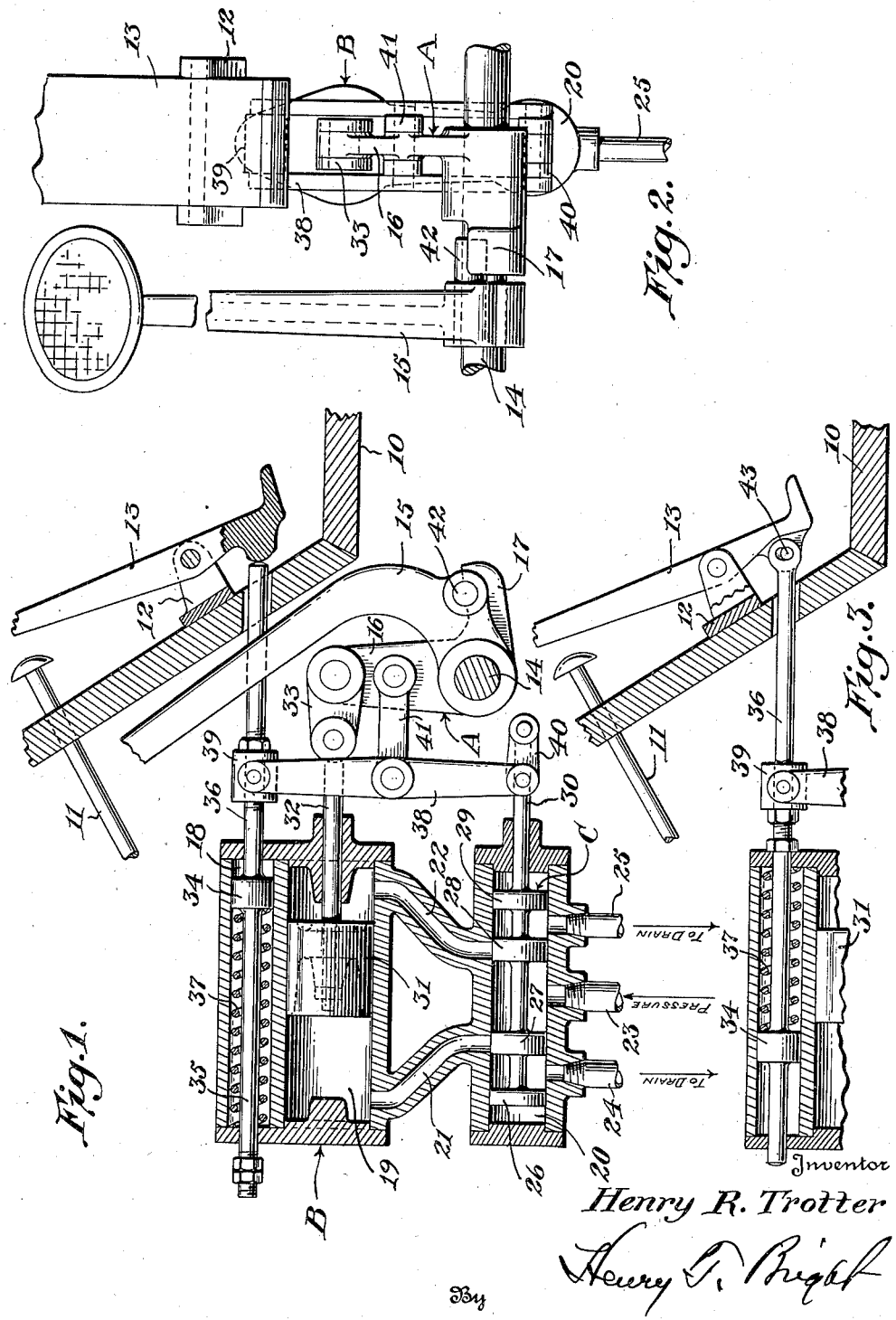
Inventor
Henry R. Trotter
By Henry G. Bright
Attorney Patented May 10, 1938

2,116,855

UNITED STATES PATENT OFFICE 2,116,855

AUTOMOTIVE BRAKE SYSTEM

Henry R. Trotter, Chicago, Ill.

Application March 23, 1936, Serial No. 70,533

7 Claims. (Cl. 192—3)

My invention relates to automotive brake systems and particularly to mechanism for effecting the application of the brakes.

It is the purpose of my invention to provide brake applying mechanism which will be powerful and certain in operation; which will provide a braking control of great smoothness; and which can be operated with rapidity and little effort.

I will describe my invention in the best form known to me at present, but it will be understood that the same is susceptible to changes in forms and proportions by the exercise of ordinary mechanical skill without departing from the spirit thereof.

In the drawing chosen to illustrate my invention the scope whereof is set forth in the appended claims—

Figure 1 is a fragmentary view partly in elevation and partly in section of an automotive brake system embodying my invention;

Figure 2, a view in elevation looking at the right hand side of Figure 1, with the automobile flooring omitted; and Figure 3 is a view showing a modified construction of valve actuator and its connection with the accelerator pedal.

Referring to Figures 1 and 2 the foot board of an automobile floor is indicated at 10 and working through an opening in this board is an accelerator rod 11. A bracket 12 is mounted on the board and pivotally supports an accelerator pedal 13 for cooperation with the rod 11 in the manner and for the purposes well known to those skilled in the art. A rotatable brake shaft 14 has mounted thereon a manually operated brake lever 15 of the foot pedal type and through the instrumentality of which the shaft 14 is rotated to effect brake application in the manner well known and understood by those skilled in the art. Loosely mounted on the shaft 14 adjacent the manually operated brake lever 15 is a power brake lever A of the bell-crank type and embodying arms 16 and 17. Located adjacent the levers 15 and A and in line with the latter is a built up housing B having an upper cylindrical chamber 18; an intermediate cylindrical chamber 19, and a lower cylindrical chamber 20. Ports or passages 21 and 22 in the casting B connect respective end portions of the chamber 19 with the chamber 20 as shown and for purposes to be hereinafter pointed out. Secured to the casting B and communicating with the chamber 20 for supplying fluid under pressure thereto is a pipe 23 while pipes 24 and 25 are also secured to the casting B and communicate with the chamber 20 for draining the fluid to a chamber of lesser pressure when it has accomplished its useful work.

Mounted to reciprocate in the chamber 20 is a balanced or pilot valve C which embodies a series of pistons 26, 27, 28 and 29, and a piston stem or rod 30 extending to the exterior of the casting B in the direction of the shaft 14. It will be noted that the pistons 27 and 28 form a chamber which is always in communication with the source of fluid under pressure, while the chambers formed by pistons 26, 27, 28, and 29 are constantly and respectively in communication with drain pipes 24 and 25.

Mounted to reciprocate in the chamber 19 is a piston 31 adapted to be operated by fluid pressure whose supply and exhaust to and from opposite ends of the piston is controlled by the valve C. A piston rod 32 is secured to the piston 31 and operates through casting B as shown; the free end of said rod being connected to the free end of the arm 16 of the power brake lever A by a link 33.

Mounted to reciprocate in the chamber 18 is a piston 34 having axial piston rods or stems 35 and 36 extending from respective ends thereof through the casting B. Surrounding the stem 35 within the chamber 18 is a spring 37 which constantly tends to move the piston 34 to the right in Figure 1. The stem 36 extends through an opening in the foot board 10 in position to be forced to the left by depressing the heel portion of the accelerator pedal 13. A floating link 38 has one end pivotally secured to the stem 36 through a collar 39 threaded on said stem. The other end of this link is pivotally connected to a link 40 and the latter is in turn pivotally connected to the free end of the stem 30 of the valve C. A link 41 has one end pivotally connected to an intermediate portion of the link 38 and its other end pivotally connected to an intermediate portion of the arm 16 of the power brake lever A.

In order to transmit brake applying force from the power brake lever A to the shaft 14 I mount in the lever 15 a laterally extending pin 42 which lies in the path of the brake applying movement of the arm 17 of the power brake lever as more clearly shown in Figure 2. It will be noted that by this construction the brake lever 15 can be operated to apply the brakes manually when desired entirely independent of the power brake lever A, there being no connection between the two levers when the lever 15 is so operated.

In normal running the accelerator pedal 13 is held in active relation to the rod 11 by the foot of the operator as is well known, and the parts of the mechanism will occupy the position shown in Figure 1. Should the need for braking arise it is only necessary that the operator rock the pedal 13 with his foot so that the heel portion thereof will engage the rod 36 and force the latter to the left against the influence of the spring 37. This movement of rod 36 will pivot the floating link 38 on the link 41 with the result that the valve C will be moved to the right in Fig. 1 so as to uncover the port 22 to the pressure chamber between pistons 27 and 28 and the port 21 to the drain or exhaust chamber between the pistons 26 and 27 thereby moving the piston 31 to the left in Fig. 1. This movement of piston 31 will in turn pivot the power lever A counterclockwise and owing to the engagement of the arm 17 of said lever with pin 42 this pivotal movement of the lever A will be transmitted to the manually operated brake lever 15 to rotate the shaft 14 and apply the brakes. As will be apparent, the counter-clockwise movement of the lever will also move the link 38 to return the valve C to the position shown in Figure 1 wherein the ports 21 and 22 are closed and all movement of the mechanism stopped with the selected braking maintained until the position of the actuating rod 36 is again changed. In other words the movement of the piston 31 is always proportional to the movement of the rod 36 and its related piston 34. When the necessity for braking passes the pedal 13 is rocked to release the rod 36 and its piston to the influence of the spring 37 whereupon the parts of the mechanism will be returned to the positions shown in Figure 1 as will be obvious.

The form of the invention shown in Figure 3 is similar to that theretofore described except that the spring 37 of the actuator is located on the opposite side of the piston 34 and serves to automatically move the rod 36 to effect braking, said rod being pivotally connected to the heel of the pedal 13 at 43. This form, as it depends on manual operation to prevent brake application, will constitute an element of safety where drivers fall asleep during long runs. Any relaxation of foot pressure on the pedal 13 will result in immediate application of the brakes and stoppage of the vehicle.

I claim:

1. In an automotive brake system, an accelerator pedal, a manually operated brake lever, a power brake lever pivoting on the same axis as the manually operated lever, an extension on the latter lever disposed in the path of the brake applying movement of the power brake lever, fluid pressure operated means having connection with the power brake lever for imparting brake applying movement to the latter, a normally closed valve controlling the fluid pressure means, an actuator positionally controlled by the accelerator pedal, connections between the actuator and valve operable by movement of the actuator to move the valve to an open position, and connections between the valve and power brake lever operable by brake applying movement of said lever to move and hold the valve to and in closed position while the actuator is moved to and held in any selected position of operation.

2. In an automotive brake system, an accelerator pedal, a manually operated brake lever, a two arm power brake lever pivoting on the same axis as the manually operated lever, an extension on the latter lever disposed in the path of the brake applying movement of one arm of the power brake lever, fluid pressure operated means having connection with the other arm of the power brake lever for imparting brake applying movement to the latter, a normally closed valve controlling the fluid pressure means, an actuator positionally controlled by the accelerator pedal, connections between the actuator and valve operable by movement of the actuator to move the valve to an open position, and connections between the valve and the last named arm of the power brake lever operable by brake applying movement of said lever to move and hold the valve to and in closed position while the actuator is moved to and held in any selected position of operation.

3. In an automotive brake system, a power brake lever, a fluid pressure operated double acting cylinder and piston, a valve operating in one open position to place one end of the cylinder in communication with a source of fluid pressure and open the other cylinder end to exhaust and in another open position to place the last named cylinder end in communication with the same source of fluid pressure and open the first named cylinder end to exhaust to impart reciprocable movements to the piston, connections between the piston and power brake lever, means for moving the valve to an open position, and means sequentially operated by movement of the power brake lever to move and hold the valve to and in closed position while the piston is in a "brake on" position.

4. In an automotive brake system, a power brake lever, a fluid pressure operated double acting cylinder and piston, a valve operating in one open position to place one end of the cylinder in communication with a source of fluid pressure and open the other cylinder end to exhaust and in another open position to place the last named cylinder end in communication with the same source of fluid pressure and open the first named cylinder end to exhaust to impart reciprocal movement to the piston, connections between the piston and power brake lever, a valve actuator, a floating link between the actuator and valve for initially moving the latter to an open position in response to movement of the actuator, and a connection between the floating link and power lever responsive to movement of the latter to sequentially operate the link to move and hold the valve in closed position while the piston is in a "brake on" position.

5. In an automotive brake system, a power brake lever, an accelerator pedal, a fluid pressure operated double acting cylinder and piston, connections between the piston and brake lever, a valve operating in one open position to place one end of the cylinder in communication with a source of fluid pressure and to open the other cylinder end to exhaust, and in another open position to place the last named cylinder end in communication with the same source of fluid pressure and open the first named cylinder end to exhaust to impart reciprocal movements to the piston, means responsive to movements of the accelerator pedal to move the valve to an open position, and means sequentially operated by movement of the power brake lever to move and hold the valve in closed position while the piston is in a "brake on" position.

6. In an automotive brake system, a power brake lever, an accelerator pedal, a fluid pressure operated double acting cylinder and piston, connections between the piston and brake lever, a valve operating in one open position to place one end of the cylinder in communication with a source of fluid pressure and to open the other cylinder end to exhaust, and in another open position to place the last named cylinder end in communication with the same source of fluid pressure and open the first named cylinder end to exhaust to impart reciprocal movements to the piston, a valve actuator positively controlled by movement of the accelerator pedal, means responsive to movement of the actuator for initially moving the valve to an open position to impart brake applying movement to the piston, and means responsive to brake applying movement of said power brake lever to sequentially move and hold the valve to and in closed position while the piston is in a "brake on" position.

7. In an automotive brake system, a power brake lever, a double acting cylinder and piston, connections between the piston and power brake lever, a valve controlling the supply and exhaust of fluid pressure to and from the ends of the cylinder to impart brake applying and release movements to the piston, a valve actuator, connections between the actuator and valve for transmitting movement of the actuator to the valve, means constantly tending to move the actuator to operate the piston to a "brake on" position, and means for manually moving the actuator against the influence of said tendency to operate the piston to "brake off" position.

HENRY R. TROTTER.